No. 748,259. PATENTED DEC. 29, 1903.
T. CARNEY.
CASH REGISTER.
APPLICATION FILED DEC. 3, 1897.
NO MODEL. 5 SHEETS—SHEET 3.
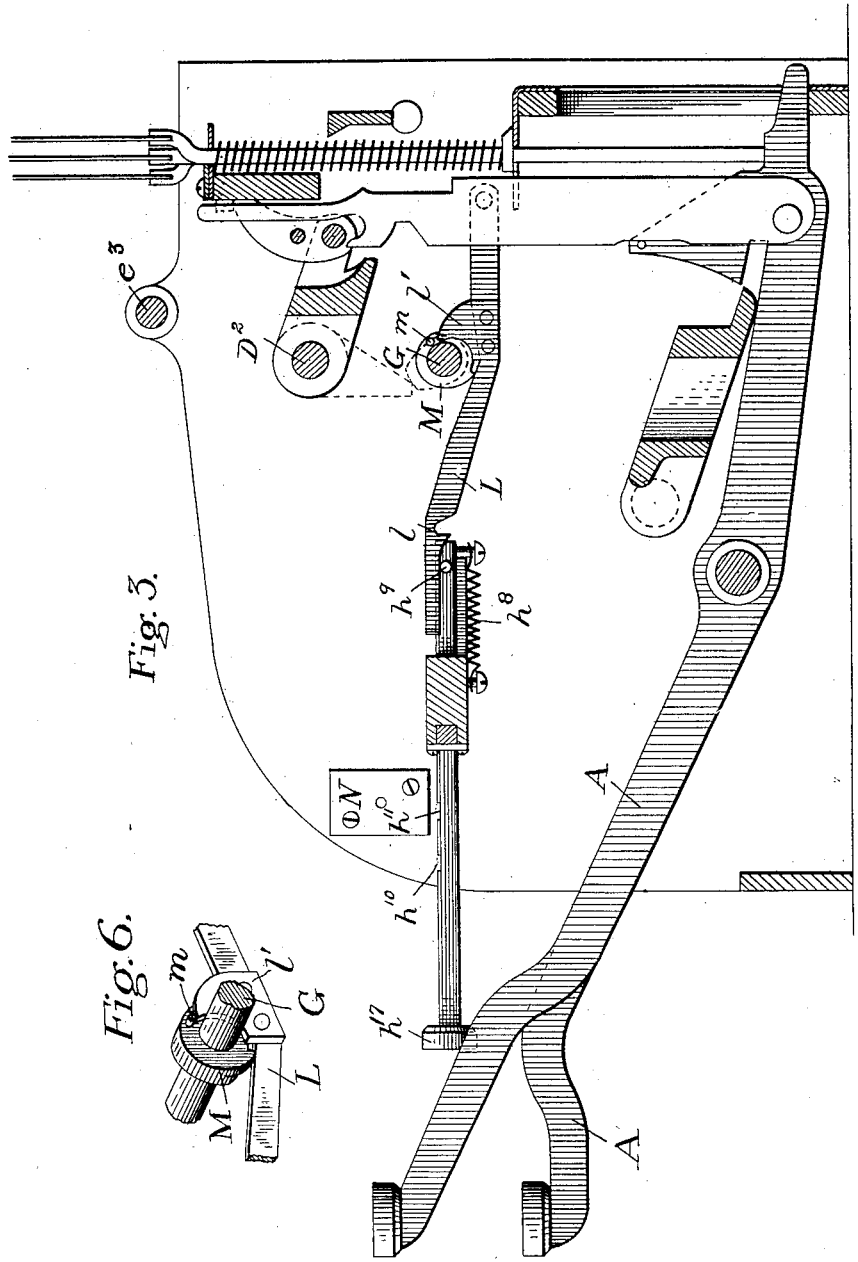

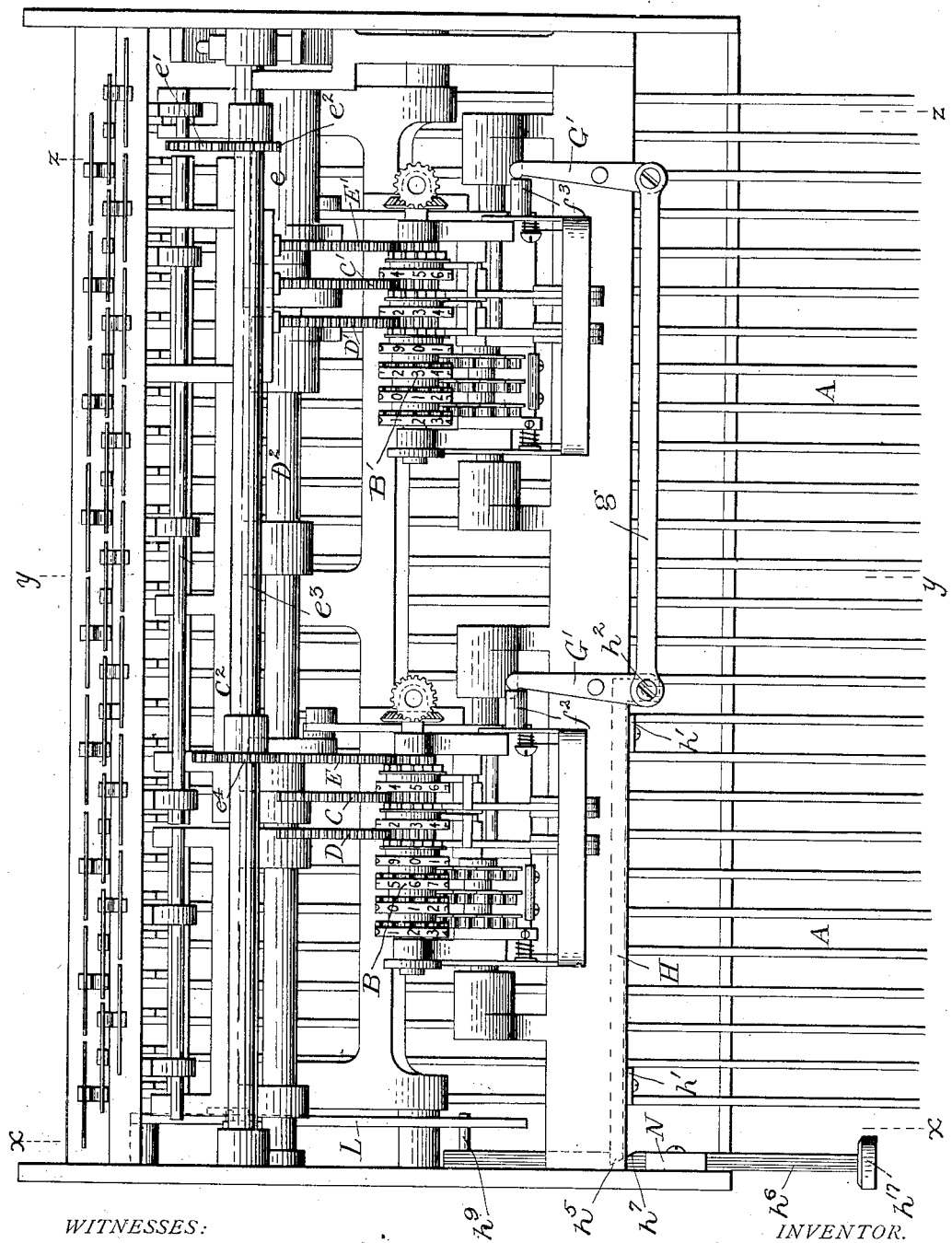

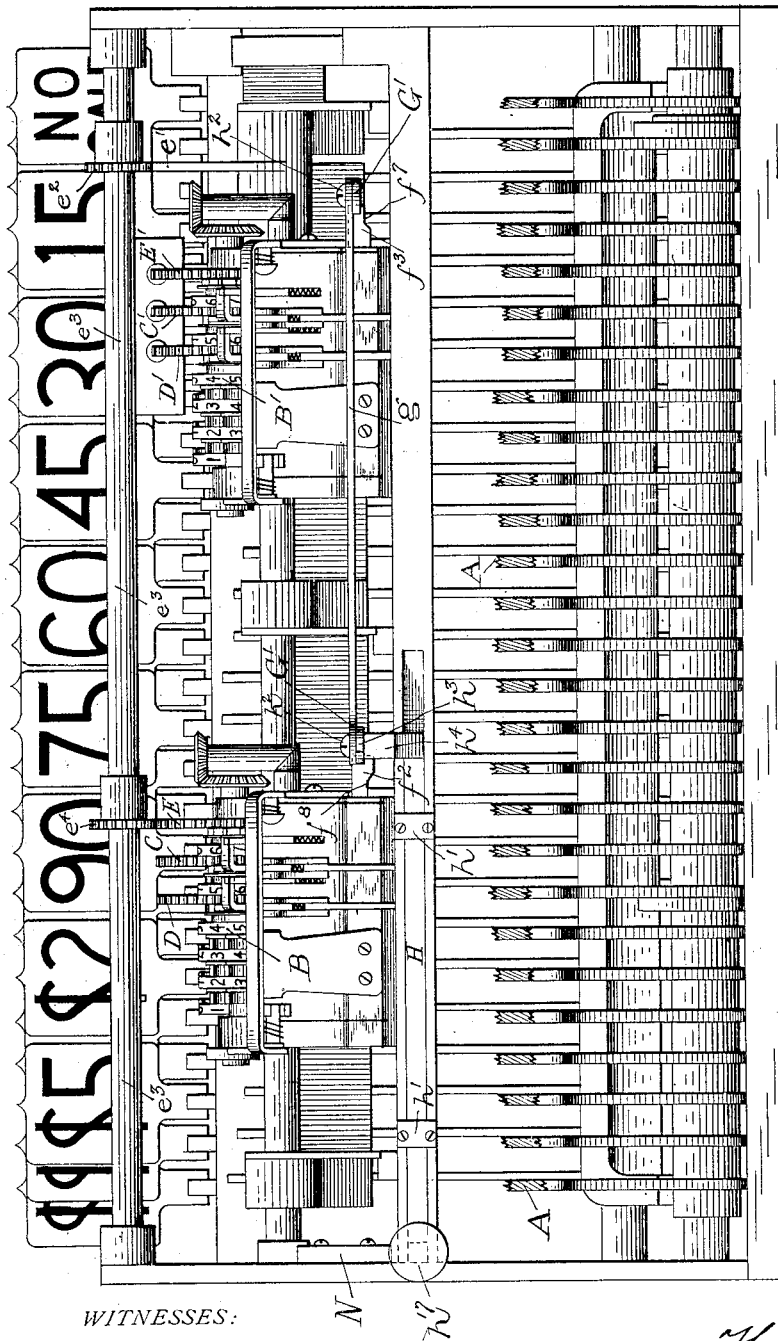

No. 748,259. PATENTED DEC. 29, 1903.
T. CARNEY.
CASH REGISTER.
APPLICATION FILED DEC. 3, 1897.
NO MODEL. 5 SHEETS—SHEET 4.
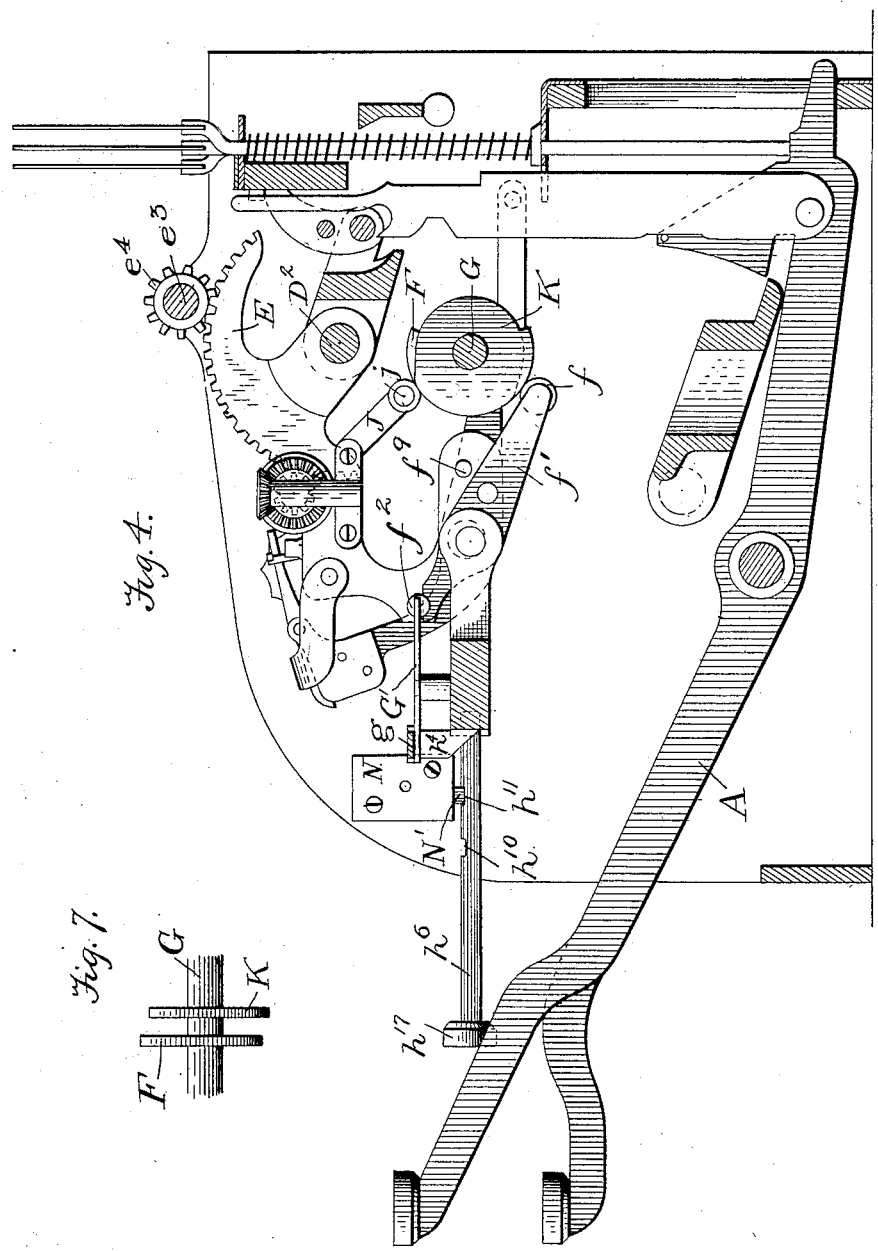
WITNESSES:
Wm McCarthy
Wm H. Muzzy
INVENTOR.
Thomas Carney
BY
Alvan Macauley.
ATTORNEY.

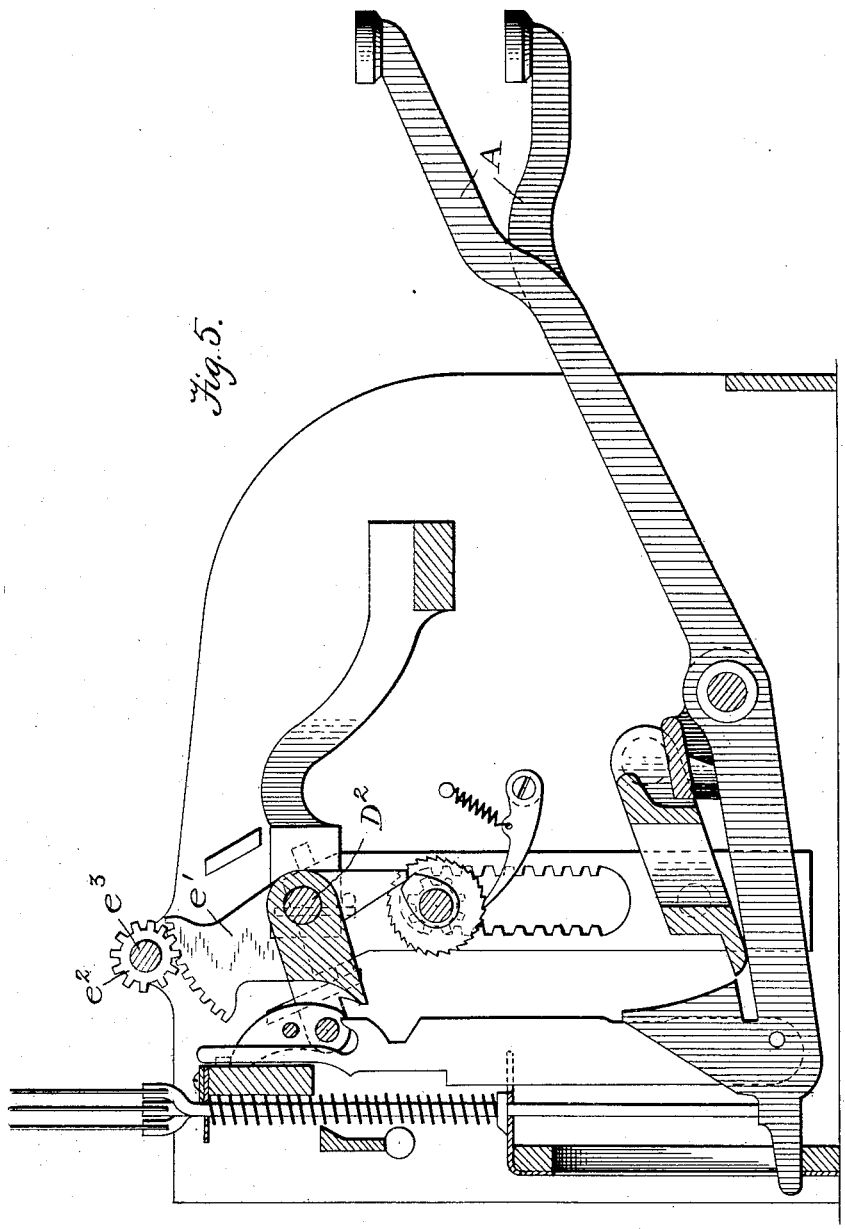

No. 748,259. Patented December 29, 1903.

UNITED STATES PATENT OFFICE.

THOMAS CARNEY, OF DAYTON, OHIO, ASSIGNOR TO THE NATIONAL CASH REGISTER COMPANY, OF DAYTON, OHIO, A CORPORATION OF OHIO.

CASH-REGISTER.

SPECIFICATION forming part of Letters Patent No. 748,259, dated December 29, 1903.

Application filed December 3, 1897. Serial No. 660,584. (No model.)

*To all whom it may concern:*

Be it known that I, THOMAS CARNEY, a citizen of the United States, residing at Dayton, in the county of Montgomery and State of Ohio, have invented certain new and useful Improvements in Cash-Registers; and I do hereby declare the following to be a full, clear, and exact description of the invention.

This invention relates to improvements in cash registers and indicators, and has more particular relation to that class of machine covered by my Patent No. 497,860, granted May 23, 1893.

The invention consists of certain novel constructions, combinations, and arrangements of parts, all of which will be hereinafter more particularly set forth and claimed.

The primary object of the invention is to provide a register and indicator of improved construction and having a plurality of registering devices so arranged that either one or the other of the same may be brought into operative connection with the key-banks at will, (whereby one or more clerks may register the amounts of their sales independently in the machine.)

In the accompanying drawings, forming part of this specification, Figure 1 represents a top plan view of the devices embodying my improvement applied to a machine of the class mentioned. Fig. 2 represents a front elevation, partly in section, of the same. Fig. 3 represents a central vertical transverse section through my said improvement on the line $x\ x$ of Fig. 1. Fig. 4 represents a similar view on the line $y\ y$ of Fig. 1. Fig. 5 represents a like view on the line $z\ z$ of Fig. 1, but looking in a direction opposite to that of Figs. 3 and 4. Fig. 6 represents an enlarged detail perspective view of the pivoted latch and operating mechanism, and Fig. 7 represents a detail side elevation of the register throwing and locking cams.

Reference may be had to my aforesaid prior patent for a detail description of the general construction and mode of operation of the machine, so that a brief description of the same will be sufficient here.

In the patent mentioned above but one registering mechanism proper is employed; but in my improved machine two similar mechanisms of this character are provided and adapted to be operated independently and separately by the same key mechanism.

In the said drawings, A A represent the pivoted keys or levers, which are arranged in banks or groups representing, respectively, units of dollars and fives and tens of cents. The registering mechanisms B and B', each of which is similar in construction and operation to that shown in the before-mentioned patent, are pivotally mounted near the opposite sides of the machine, so that they may be oscillated, and thus brought into the proper position to receive motion from the segmental operating-racks C C', D D', and E E' or withdrawn from the same. The oscillating movement of the registers is accomplished by means of a plurality of cams F F, fast upon the rotatable power-shaft G of the machine and engaging, respectively, with antifriction-rollers $f f$, mounted on the outer ends of throwing-levers $f'\ f'$, which are pivoted on the sides of the respective oscillating register-frames. The construction and location of each of the levers $f'$ is such that the antifriction-roller $f$ of the same lies out of the path of its respective cam F when the rear end of the lever is allowed to ascend, as hereinafter described. Said levers are operated to raise the antifriction-rollers into the paths of the cams by plungers $f^2\ f^3$, operating in suitable sockets in the oscillating frames of the registering mechanisms. Each plunger is forced forward partly out of its respective socket when relieved of the pressure of its lever G', hereinafter described, by a suitable spring mounted in said socket behind it. The plunger $f^3$ is notched or reduced on its under side near its end, as at $f^7$, while the plunger $f^2$ is similarly reduced on its under side some distance from the end, as at $f^8$. Each of the levers $f'$ bears with its rear end against the under side of its respective plunger, so that the position of said plungers, with their reduced portions either in or out of alinement with said levers, governs the positions of the latter, the movements of the levers being limited by stoppins $f^9\ f^9$, mounted on the frames of the registering mechanisms. The pivot-points of the throwing-levers $f'$ are so located that the predominating weight of each lever is rearward of its fulcrum, thus causing the rearward end of said lever, with its antifriction-roller, to drop away from its cam when the front end of the lever is permitted to ascend. The end of each of the plungers $f^2$ and $f^3$ abuts against the end of a pivoted operating-lever G', mounted upon the frame, said operating-levers being connected by a link-bar $g$, which is pivotally secured at its opposite ends to the ends of said levers, whereby they move simultaneously. One of said levers, G', is further pivotally connected to a sliding operating-bar H, mounted in a suitable groove formed in the frame and held in place by securing-plates $h'$ $h'$, which extend over said groove and bar. The connection between said bar H and the lever G' is made by means of a pivot-screw $h^2$, which passes through a slot $h^3$, formed in the lever G', and also through the link-bar $g$, said screw entering a screw-threaded socket formed in an angular offset $h^4$ of the bar H. One end of this sliding bar is beveled, as at $h^5$, and is engaged by the bevel wall of a recess $h^7$, formed in a sliding shifting bar $h^6$.

It will be observed from the foregoing description that any longitudinal movement of the bar H will cause the levers G' to be simultaneously operated, thus forcing both of the plungers $f^2$ and $f^3$ into their sockets or allowing them to pass partly out of the same. When the plungers are in their respective sockets, one of the levers $f'$ rests with one end in the notch $f^7$ and the opposite end carrying the antifriction-roller out of the path of the cam, while the remaining lever rests with one end under the plunger $f^2$, but out of the notch $f^8$, and the opposite end in the path of the cam. If a key is now operated, the last-mentioned lever will be thrown by the contact of the cam with the antifriction-roller on said lever, and the registering mechanism thus brought into the proper position to receive motion from the segmental racks D, C, and E. These racks are connected to the segmental racks D', C', and E' in pairs, so as to move together. The racks D and D', which govern the dollar registering mechanisms, are both keyed or otherwise rigidly secured to an oscillating shaft $D^2$, so as to move together, while the racks C and C', which govern the respective tens-of-cents registering mechanisms, are loose upon said shaft, but are yoked together by a frame $C^2$, so as to move together. The racks E and E', which govern the fives-of-cents registering mechanisms, are also mounted loosely upon the shaft $D^2$, and one of the same is provided with a sleeve or hub extension $e$, upon which is mounted another segmental rack $e'$, which latter meshes with a gear-wheel $e^2$, fast upon an auxiliary coupling-shaft $e^3$, which is suitably journaled in the frame of the machine. This coupling-shaft is in turn provided with a gear-wheel $e^4$, meshing with the segmental rack E, said rack being of abnormal length to permit of such engagement. Each of the oscillating frames of the registering mechanisms is provided with a rigid arm J, having an antifriction-roller $j$ at its outer end, said roller engaging the periphery of a cam K, mounted on the shaft G, and thus throw said counter-frame back out of operative position and hold it so during the inactive period of the counter-frames. By this means both of the registering mechanisms are locked in their inoperative positions and only released from the same at the proper time for one or the other to receive motion from its operating-segments D, C, and E or D', C', and E', said segments being actuated by the keys, as described in my aforesaid patent. The shifting bar $h^6$, by means of which either one or the other of the registering mechanisms is operated, is mounted in suitable guides in the frame of the machine, so that it may readily be pushed backward by pressure upon the button $h^{17}$, with which it is provided. A coil-spring $h^8$ is connected to the rear end of this shifting bar and also to a portion of the frame of the machine, whereby a tension is secured which tends to normally force the bar forward when the same is free. The rear end of the bar is further provided with a laterally-projecting stud $h^9$, upon which rests the forward end of a latching-lever L, the rear end of the latter being pivoted to a portion of the frame of the machine. The said latching-lever is formed with a detent or notch $l$, in which the stud $h^9$ rests when the shifting bar is in its rearmost position. The latching-lever is further provided with a segmental nose $l'$, by means of which it is lifted to disengage it from the stud $h^9$ of the shifting bar and permit this bar to pass forward. This nose is engaged and lifted by a pin $m$, mounted upon a cam M, which in turn is mounted upon the shaft G, which makes a complete rotation whenever the keys are operated.

It will be observed from the above description that as the cam $m$ rotates the nose $l'$ is first raised by the pin $m$, and the lever L then immediately forced downward by the periphery of the cam engaging its upper edge, which action releases the shifting bar and permits it to assume its normal position. The upper edge of the shifting bar is notched, as at $h^{10}$ $h^{11}$, to receive the bolt N' of a lock N, which is secured to the frame of the machine, whereby said shifting bar may be positively locked in the desired position to cause either one or the other of the registering mechanisms to be operated upon the keys being depressed. It will be further observed from the foregoing description that my improved construction permits of a single machine being used by two clerks to keep separate accounts, the only difference in operation being the adjustment of the shifting bar, which latter can either be locked in one position or the other or operated by the respective clerks as described. When used in the last-mentioned manner, the shifting bar is automatically returned to its normal position by the mechanism described.

Having thus described my invention, what I claim as new, and desire to secure by Letters Patent, is—

1. In a cash-register the combination with a plurality of operating-keys, of duplicate register-operating devices coupled so as to operate simultaneously, a plurality of independent registering mechanisms adapted to be moved into connection with the operating devices, and means for simultaneously adjusting all of said registering mechanisms, whereby only one of the same is thrown into connection with its respective operating device upon the movement of the machine.

2. In a cash-register the combination with a plurality of operating-keys, of a plurality of independent registering mechanisms, duplicate register-operating devices having their corresponding portions coupled so as to operate simultaneously, means for moving the registering mechanisms into connection with the operating devices, and devices for simultaneously throwing one of said registering mechanisms into connection with said means for moving the registering mechanism and withdrawing the remainder from such connection.

3. In a cash-register, the combination with operating devices, of a plurality of independent registering mechanisms, single shifting devices for bringing any of said mechanisms into operative relation with the operating devices and means for locking said shifting devices so that any of the registering mechanisms may be permanently locked in inoperative position against any unauthorized displacement.

4. In a cash-register the combination with a plurality of operating-keys, of a plurality of independent registering mechanisms, operating-racks for each of said mechanisms, coupling devices for connecting the corresponding racks of the different registering mechanisms so that they move together and means for simultaneously adjusting all of the registering mechanisms whereby only one of the same is thrown into connection with its respective racks upon the movement of the machine.

5. In a cash-register the combination with a plurality of operating-keys arranged in banks, of a plurality of independent registering mechanisms, each of which corresponds to said banks, duplicate operating devices connected to the keys and adapted to be engaged by the registering mechanisms, couplings for connecting the respective like bank portions of the operating devices so that they move together, and means for simultaneously adjusting all of the registering mechanisms, whereby only one of the same is thrown into connection with its respective operating device upon the movement of the machine.

6. In a cash-register, the combination with a series of operating-keys, of duplicate register-operating mechanisms both having the same movements, a register normally disengaged from one of said mechanisms, a second register normally disengaged from the other of said mechanisms, means for automatically bringing the first register into engagement with its operating mechanism when the keys are actuated, and independent means for shifting the connections when desired so that the second-mentioned register will be automatically thrown into connection with the register-operating mechanism when the keys are operated, and means for simultaneously locking the first register from such engagement, substantially as described.

7. In a cash-register, the combination with a plurality of operating-keys, of a plurality of pivotally-mounted independent registering mechanisms, a shaft, a plurality of racks rigidly mounted on said shaft and adapted to be engaged by the respective registering mechanisms, other racks loosely mounted upon said shaft in proximity to the respective registering mechanisms and connected so as to move simultaneously, and shifting devices for throwing any one of the registering mechanisms into connection with said duplicate racks.

8. In a cash-register, the combination with a register-operating mechanism, of a plurality of counters, a counter-shifting rod common to all the counters, a key for moving said rod, a latch for holding said key in its set position, a cam mounted upon a movable part of the machine and operating means between said cam and latch.

9. In a cash-register the combination with a plurality of operating-keys, of a plurality of independent, movable registering mechanisms, duplicate register-operating devices, throwing-levers for the registering mechanisms, means for simultaneously moving one of said levers into operative position and the remainder out of operative position, and lever-operating devices adapted to strike said levers and throw the registering mechanisms into operative positions.

10. In a cash-register, the combination with the register-operating mechanism, of the duplicate registers, a shifting bar, shifting levers, means operated by the shifting bar for actuating said levers to throw one of the registers into position for engagement and the other out of position for engagement with the register-operating mechanism, and means actuated by the keys for automatically reversing the relative positions of the registers with reference to the register-operating mechanism.

11. In a cash-register the combination with a plurality of operating-keys, of a plurality of independent registering mechanisms, levers for separately throwing said mechanisms into operative positions, a power-shaft operated by the keys, cams on said shaft adapted to engage said throwing-levers and means for simultaneously moving said levers so that only one of the same will be engaged by any of the cams at the same time.

12. In a cash-register the combination with a plurality of operating-keys, of a plurality of independent movable registering mechanisms, register-operating devices, levers for throwing said mechanisms into connection with the operating devices, locking-arms connected to said mechanisms for holding them out of contact with the operating devices, a power-shaft connected with the keys, cams on said shaft adapted to engage both the throwing-levers and the locking-arms, and means for adjusting said levers into or out of operative position.

13. In a cash-register the combination with a plurality of operating-keys, of a plurality of independent registering mechanisms, register-operating devices, a shifting bar connected to the registering mechanisms, a spring for normally holding said bar in one position, a latch for holding said bar in the opposite position, and means connecting said latch with the keys whereby it is operated to release the shifting bar upon said keys being operated.

14. In a cash-register the combination with a plurality of operating-keys, of a plurality of pivoted independent registering mechanisms, throwing-levers pivotally mounted on the frames of said mechanisms, notched plungers also mounted on said frames and adapted to adjust the positions of the levers, means for simultaneously operating said plungers, cams connected to the moving parts of the machine for operating said levers, and register-operating devices so located as to be engaged by the registering mechanisms when the latter are moved by the throwing-levers.

15. In a cash-register, the combination with a register-operating mechanism, of a plurality of registers normally disengaged therefrom, a shifting-rod for adjusting said registers so that any one of them as desired may be brought into operative connection with the register-operating mechanism, operating-keys, and means connecting said keys to the operating mechanism so that when they are operated they will first bring the desired register into operative connection and then record upon said register the numerical value of the operated keys.

16. In a cash-register, the combination with a register-operating mechanism, of a plurality of registers arranged to be brought into connection therewith at will, a movable rod arranged to shift the connections so that one or the other of said counters is thrown into operative position, a pivoted lever arranged to engage a projection of said rod and lock it in position, and a cam mounted on a movable part of the machine and arranged to engage and operate said lever to release the rod near the end of the operation of the machine.

17. In a cash-register, the combination with the operating value-keys and a register-operating mechanism arranged to be actuated thereby, of a plurality of registers normally disconnected from the latter but arranged to be brought into connection therewith at will, a shifting-rod arranged to shift the connections so that one or the other of said registers will be adjusted to operative position, and means actuated by the said value-keys for moving the desired register into engagement with the register-operating mechanism, recording the numerical value of the operated keys upon the desired register, returning all the registers to normal position and returning the shifting-rod also to normal position, substantially as described.

18. In a cash-register, the combination with the duplicate register-operating mechanisms, of the register B, a second register B', a shifting bar, a pair of levers G' for throwing one of the registers into position for engagement with the operative means and the other out of position for such engagement, and a link connecting said levers and causing them to operate simultaneously.

19. In a cash-register, the combination with a register-operating mechanism, of a plurality of registers normally disengaged therefrom, means for predetermining which register shall be engaged with the operating mechanism, a series of operating-keys, and means connecting said keys to the operating mechanism whereby when they are operated they will first bring the desired register into operating connection and then add upon said register the numerical values of the keys operated.

20. In a cash-register, the combination with a register-operating mechanism, of a plurality of registers normally disengaged therefrom, a series of operating-keys, and means for bringing the registers into connection with the operating mechanism arranged to be set to be actuated by the keys; the construction being such that when the keys are operated they will first bring the desired register into connection with the operating mechanism and then actuate said mechanism to add upon said register the values of the operated keys.

21. In a cash-register, the combination with a series of operating-keys, of a register-operating mechanism, a register normally disengaged from said mechanism, a second register also normally disengaged from said mechanism, means for automatically bringing the first register into engagement with the operating mechanism when the keys are actuated, and means for preventing this regular operation of one register and causing the other register to be thrown into operation upon the movement of the keys; the construction being such that if the register is thrown in by the keys the continued movement of the latter will register the proper amount.

22. In a cash-register, the combination with a series of operating-keys, of an operating mechanism, a plurality of independent registers, a single adjusting device for bringing either one or the other of the registers into coöperative relation with the operating devices, and a locking means for locking said adjusting devices in any desired position so that either one or the other of the registering mechanisms may be locked in inoperative position against any unauthorized displacement as long as desired.

23. In a cash-register, the combination with a series of operating-keys, of an operating mechanism connected thereto, a plurality of independent registers, a single adjusting device for adjusting the desired register so that upon the operation of the keys it will be brought into connection with the operating mechanism and then actuated according to the value of the key operating said mechanism, and a locking means for locking said adjusting devices in either of their shifted positions so that either one or the other of the registers may be locked in inoperative position against any unauthorized displacement as long as desired.

In testimony whereof I affix my signature in presence of two witnesses.

THOMAS CARNEY.

Witnesses:
WM. MCCARTHY,
ALVAN MACAULEY.